(12) United States Patent
Kim et al.

(10) Patent No.: US 9,278,621 B2
(45) Date of Patent: Mar. 8, 2016

(54) VEHICULAR CONTROL SYSTEM AND ITS OPERATING METHOD

(71) Applicant: Hyundai Motor Company, Seoul (KR)

(72) Inventors: Do-Hoon Kim, Seoul (KR); Zeung-Il Kim, Hwaseong-si (KR); Chi-Ho Kim, Gunpo-si (KR); Sung-Hon Baig, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 35 days.

(21) Appl. No.: 14/242,486

(22) Filed: Apr. 1, 2014

(65) Prior Publication Data

US 2015/0149007 A1    May 28, 2015

(30) Foreign Application Priority Data

Nov. 26, 2013   (KR) ................. 10-2013-0144459

(51) Int. Cl.
| | |
|---|---|
| *B60L 3/04* | (2006.01) |
| *B60L 11/18* | (2006.01) |
| *B60L 3/00* | (2006.01) |
| *B60K 28/14* | (2006.01) |
| *B60W 10/06* | (2006.01) |
| *B60W 10/08* | (2006.01) |
| *B60W 10/26* | (2006.01) |

(52) U.S. Cl.
CPC . *B60L 3/04* (2013.01); *B60K 28/14* (2013.01); *B60L 3/0007* (2013.01); *B60L 11/1809* (2013.01); *B60L 11/1816* (2013.01); *B60W 10/06* (2013.01); *B60W 10/08* (2013.01); *B60W 10/26* (2013.01); *B60L 2240/421* (2013.01); *B60L 2240/461* (2013.01)

(58) Field of Classification Search
None
See application file for complete search history.

(56) References Cited

U.S. PATENT DOCUMENTS

| | | | |
|---|---|---|---|
| 8,892,312 B2 * | 11/2014 | Inagaki ......................... | 701/45 |
| 2012/0070706 A1 | 3/2012 | Miyazaki et al. | |
| 2012/0072066 A1 * | 3/2012 | Kato et al. ..................... | 701/22 |
| 2012/0133204 A1 | 5/2012 | Ang et al. | |
| 2013/0049663 A1 * | 2/2013 | Amano et al. ................ | 318/453 |
| 2013/0293201 A1 * | 11/2013 | Ono ............................... | 320/138 |
| 2014/0121962 A1 * | 5/2014 | Rao et al. ..................... | 701/500 |
| 2014/0379200 A1 * | 12/2014 | Yagi et al. ..................... | 701/29.4 |

FOREIGN PATENT DOCUMENTS

| | | |
|---|---|---|
| DE | 10 2011 078 687 A1 | 1/2013 |
| EP | 1 839 985 A2 | 10/2007 |
| JP | 2002-347541 A | 12/2002 |

(Continued)

OTHER PUBLICATIONS

Extended Search Report issued in corresponding European Patent Application No. 14162659.8, mailed on May 22, 2015.

*Primary Examiner* — Jerrah Edwards
*Assistant Examiner* — Paul Castro
(74) *Attorney, Agent, or Firm* — McDermott Will & Emery LLP

(57) ABSTRACT

A vehicular control system includes a charger configured to charge a battery of a vehicle from an external power supply source. A controller is configured to be activated when the charger starts charging in an ignition off state of the vehicle and blocks a high voltage system of the vehicle when it is determined that the vehicle receives a shock from outside the vehicle by using positional information transferred from a motor position sensor of a driving motor.

16 Claims, 5 Drawing Sheets

(56) References Cited

FOREIGN PATENT DOCUMENTS

| | | |
|---|---|---|
| JP | 2011-010406 A | 1/2011 |
| JP | 2011-217544 A | 10/2011 |
| KR | 20-1999-0021079 U | 6/1999 |
| KR | 10-0739080 B1 | 7/2007 |
| KR | 10-2013-0053037 A | 5/2013 |
| WO | 2011/024285 A1 | 3/2011 |
| WO | 2011/042807 A1 | 4/2011 |

* cited by examiner

VEHICULAR CONTROL SYSTEM AND ITS OPERATING METHOD

CROSS-REFERENCE TO RELATED APPLICATION

This application claims the benefit of priority to Korean Patent Application No. 10-2013-0144459 filed on Nov. 26, 2013, the entire contents of which are incorporated herein by reference in its entirety.

TECHNICAL FIELD

The present disclosure relates to a vehicular control system and its operating method, and more particularly, to a vehicular control system and its operating method capable of solving an electrical safety problem by performing a high voltage blocking function at the time of a collision during charging.

BACKGROUND

Currently, a vehicular control system to perform a high voltage blocking function at the time of a collision in a vehicle ignition (IG) on/ready condition has been developed. The vehicular control system including the high voltage blocking function may minimize a vehicle fire due to a disconnection of a high voltage system and minimize causalities due to an instantaneous introduction of large current at the time of the collision.

However, since the vehicle is in an ignition-off state when charging, the high voltage may not appropriately be blocked when the collision occurs.

In particular, in connection with a charging frequency (for example, once a day) and a charging time (for example, rapid charging time of approximately 25 minutes and slow charging time of approximately 5 hours) of an electric vehicle, it is necessary to develop a safe vehicular control system when a collision occurs during charging.

SUMMARY

An embodiment of the present disclosure is directed to a vehicular control system and its operating method capable of reducing a vehicle fire due to a disconnection of a high voltage system and reducing causalities due to an instantaneous introduction of a large current into a vehicle by blocking a high voltage when a collision occurs at an ignition off time during charging.

In accordance with an embodiment of the present disclosure, a vehicular control system includes a charger charging a battery of a vehicle. A controller is activated when the charger starts charging in an ignition off state of the vehicle and blocks a high voltage system of the vehicle when it is determined that the vehicle receives a shock from outside the vehicle. The controller may be activated by power supplied through the charger.

The controller may be implemented as a vehicle controller (VC), a motor controller (MC), a battery management system (BMS), and on-board computer (OBC).

The controller determines that the vehicle receives the shock from the outside by using gyro sensing information transferred from a gyro sensor.

The controller stores gyro sensing information transferred from a gyro sensor when the vehicle stops, compares the stored gyro sensing information with current gyro sensing information transferred from the gyro sensor, and determines that the vehicle receives the shock from the outside when a comparison result value of the gyro sensing information is within a set range.

The gyro sensor may be a yaw rate sensor embedded in a navigator mounted in the vehicle.

The controller determines that the vehicle receives the shock from the outside by using speed information transferred from a wheel speed sensor of the vehicle.

The wheel speed sensor is activated by power supplied through the charger.

The controller stores speed information transferred from the wheel speed sensor when the vehicle stops, compares the stored speed information with current speed information transferred from the wheel speed sensor, and determines that the vehicle receives the shock from the outside when a comparison result value of the speed information is within a set range.

The controller is interlocked with an airbag controller of the vehicle, activates the interlocked airbag controller while activated when the charger starts charging in the ignition off state of the vehicle, and blocks a high voltage system of the vehicle when an airbag unfolding signal of a control signal is transferred from the airbag controller in an ignition (IG) on or IG ready state of the vehicle.

The airbag controller of the vehicle is activated when an airbag unfolding signal of a control signal is not transferred from the airbag controller in the IG on or IG ready state of the vehicle.

The controller determines that the vehicle receives the shock from the outside by using positional information transferred from a motor position sensor of a driving motor.

The controller stores the positional information transferred from the motor position sensor when the vehicle stops, compares the stored positional information with current positional information transferred from the motor position sensor, and determines that the vehicle receives the shock from the outside when a comparison result value of the positional information is within a set range.

The high voltage system is blocked by blocking a main relay of the BMS.

In accordance with another embodiment of the present disclosure, an operating method of a vehicular control system includes activating the vehicular control system when a charger starts charging in an ignition off state of a vehicle. Whether the vehicle receives a shock from outside the vehicle is determined. A high voltage system of the vehicle is blocked when it is determined that the shock is applied from outside the vehicle. The vehicular control system is activated by power supplied through the charger.

The step of determining whether the vehicle receives the shock from the outside comprises storing gyro sensing information transferred from a gyro sensor when the vehicle stops. The stored gyro sensing information is compared with current gyro sensing information transferred from the gyro sensor. Whether the vehicle receives the shock from the outside is determined when a comparison result value of the gyro sensing information is within a set range.

The step of determining whether the vehicle receives the shock from the outside further comprises storing positional information transferred from a motor position sensor when the vehicle stops. The stored positional information is compared with current positional information transferred from the motor position sensor. Whether the vehicle receives the shock from the outside is determined when a comparison result value of the positional information is within a set range.

The step of determining whether the vehicle receives the shock from the outside comprises storing speed information transferred from a wheel speed sensor when the vehicle stops. The stored speed information is compared with current speed information transferred from the wheel speed sensor. Whether the vehicle receives the shock from the outside is determined when a comparison result value of the speed information is within a set range.

In accordance with another embodiment of the present disclosure, an operating method of a vehicular control system includes activating an airbag controller while the vehicular control system is activated, when a charger starts charging in an ignition (IG) off state of a vehicle. The high voltage system of the vehicle is blocked when an airbag unfolding signal of a control signal is transferred from the airbag controller in an IG on or IG ready state of the vehicle.

The operating method of a vehicular control system may further include blocking the high voltage system of the vehicle when the airbag unfolding signal of the control signal is transferred from an airbag controller in the IG on or IG ready state of the vehicle.

DETAILED DESCRIPTION

Hereinafter, a vehicular control system and its operating method in accordance with embodiments of the present disclosure will be described with reference to the accompanying drawings. Components are conceptually illustrated in the accompanying drawings to describe a concept of the present disclosure, and a description of known components among the components will be omitted.

Embodiments are provided so that this disclosure will be thorough and complete, and will fully convey the concept of the disclosure to those skilled in the art. In the accompanying drawings of the present disclosure, shapes and dimensions of components may be exaggerated for clarity.

Hereinafter, a vehicular control system in accordance with an embodiment of the present disclosure will be described with reference to FIG. 1. The vehicular control system in accordance with an embodiment of the present disclosure may include a charger 10 and a controller 20. The charger 10 is an apparatus to charge a vehicle from an external power supply source and may activate the controller 20 using power transferred from the external power supply source when the charging starts.

The controller 20 is activated when the charger starts charging in an ignition off state of the vehicle and may block a high voltage system of the vehicle when it is determined that the vehicle receives a shock from the outside by using positional information transferred from a motor position sensor mounted at a driving motor. The controller 20 may be activated by power supplied through the charger 10. Herein, the controller 20 may be implemented as a vehicle controller (VC), a motor controller (MC), a battery management system (BMS), and an on-board computer (OBC).

In detail, the controller 20 stores the positional information transferred from the motor position sensor when the vehicle stops and compares the stored positional information with current positional information transferred from the motor position sensor. Then the controller 20 may determine that the vehicle receives the shock from the outside when a comparison result value of the positional information is within a set range.

When a collision occurs, the motor position sensor reads a different position value from a vehicle stopping condition. Since the regulations prohibit driving the vehicle while charging, the motor position sensor value is changed when charging. When a singular motor position value is generated, it may also be considered that the collision occurs. Values of U, V, and W phases of the motor position sensor may be instantly different from a value when the vehicle stops due to the shock.

Further, the controller 20 interlocks with an airbag controller of the vehicle and may block the high voltage system of the vehicle when an airbag unfolding signal of a control signal is transferred from the interlocking airbag controller, in an IG on or IG ready state of the vehicle.

Figure 2:
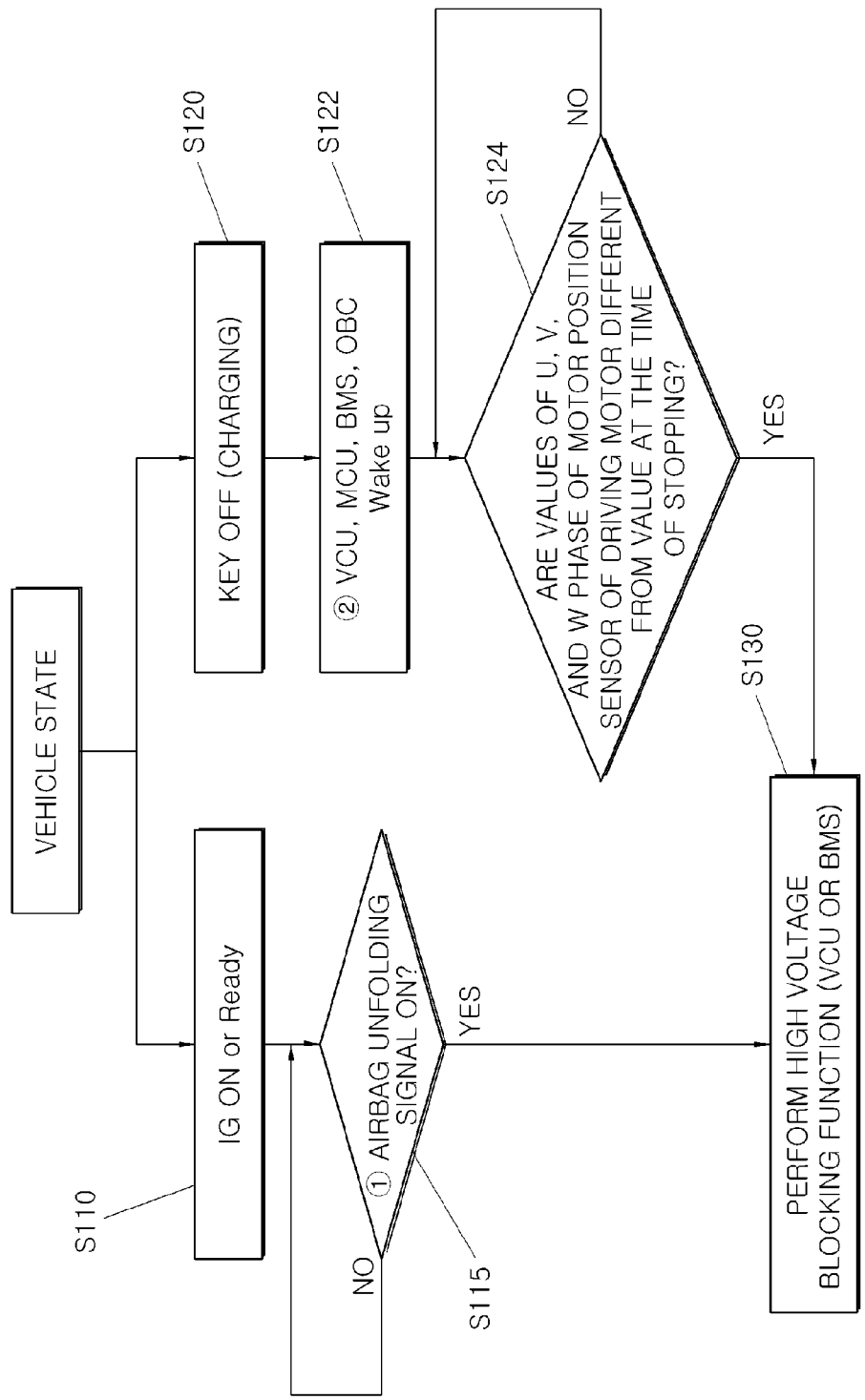
FIG. 2 is a control procedure diagram for describing a method of operating a vehicular control system in accordance with an embodiment of the present disclosure.

Hereinafter, an operation of the vehicular control system in accordance with an embodiment of the present disclosure will be described with reference to FIG. 2.

The vehicular control system performs a high voltage blocking function (S130) when it is determined that the airbag unfolding signal is on (S115) in the IG on or IG ready state (S110). The vehicular control system is activated by power supplied through the charger 10 (S122) when it is determined that the charger 10 starts charging in the ignition off state of the vehicle (S120) and blocks the high voltage system of the vehicle (S130) when it is determined that the vehicle receives a shock from the outside by using positional information transferred from the motor position sensor of the driving motor (S124).

As set forth above, the vehicular control system in accordance with embodiments of the present disclosure may block the high voltage when a collision occurs at the time of the ignition off for charging by using the information transferred from the motor position sensor of the driving motor to reduce a vehicle fire due to the disconnection of the high voltage system and reduce causalities due to an instantaneous introduction of the large current into the vehicle, thereby improving the safety performance of the vehicle.

Figure 1:
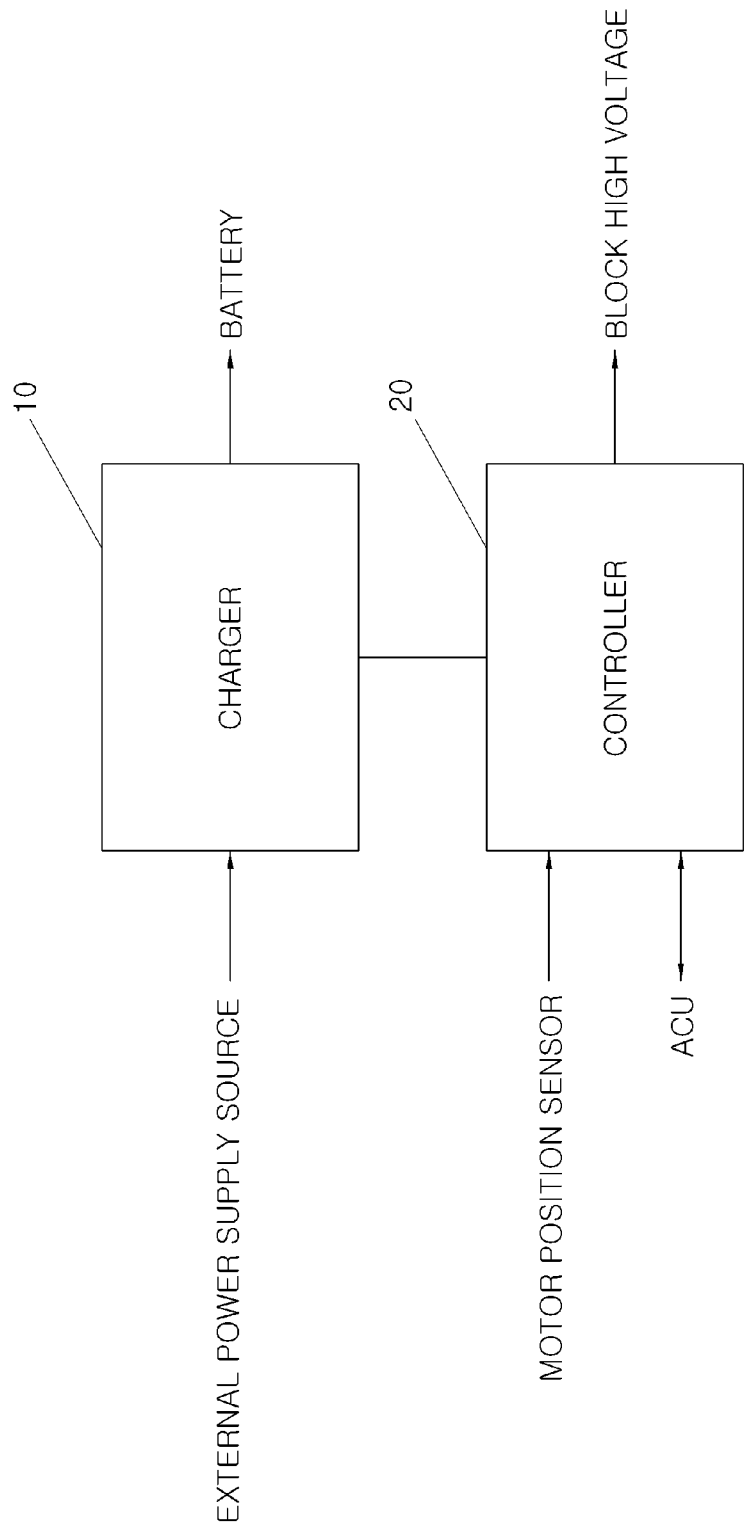
FIG. 1 is a block diagram of a vehicular control system in accordance with an embodiment of the present disclosure.
Figure 3:
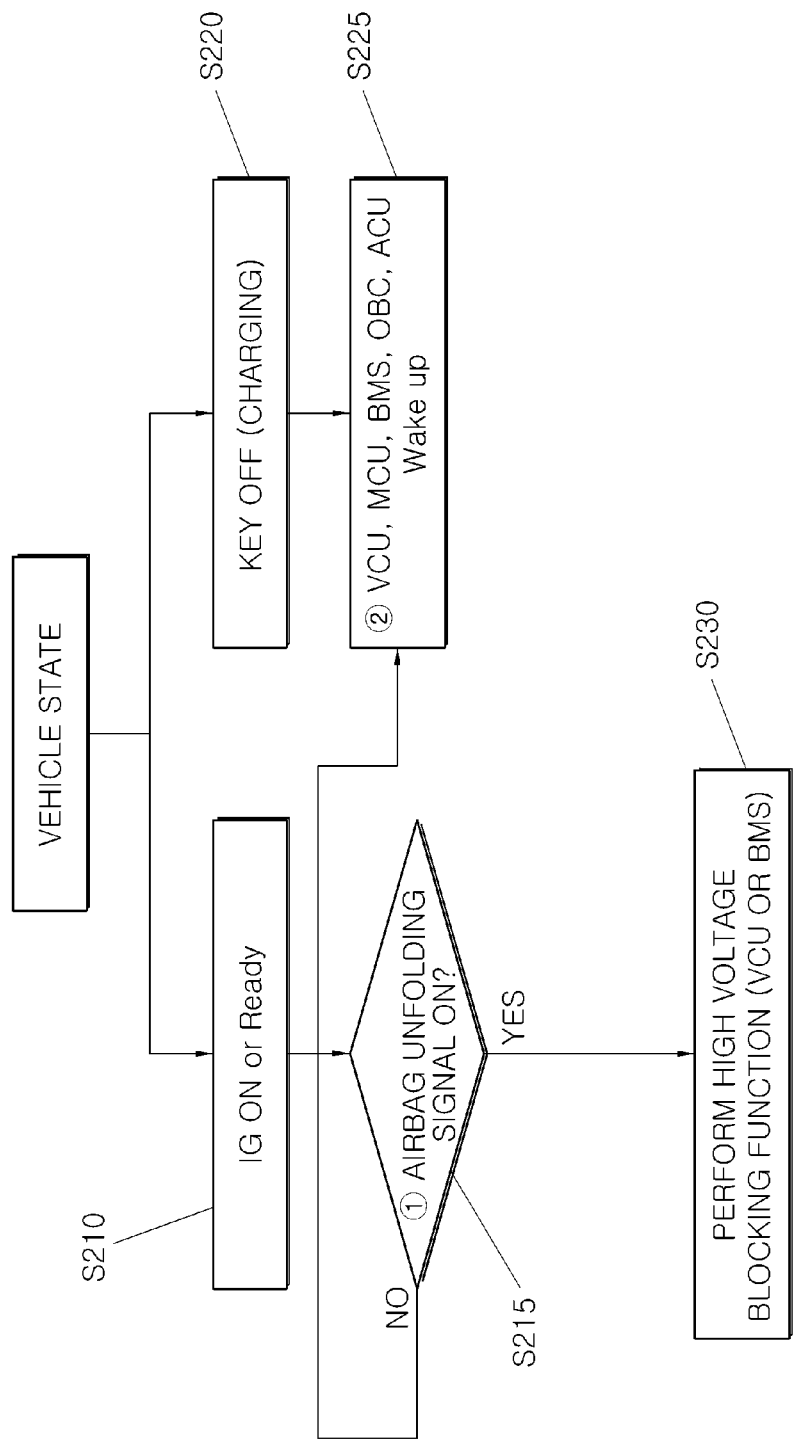
FIG. 3 is a control procedure diagram for describing a method of operating a vehicular control system in accordance with another embodiment of the present disclosure.

A vehicular control system in accordance with another embodiment of the present disclosure may be the same as the configuration illustrated in FIG. 1 as described above. However, there is a difference in the operation of the controller. The operation of the vehicular control system in accordance with another embodiment of the present disclosure will be described with reference to FIG. 3.

The controller of the vehicular control system in accordance with an embodiment of the present disclosure may block the high voltage system of the vehicle (S230) when it is determined that the airbag unfolding signal of a control signal is transferred from the airbag controller (S215) in the IG on or IG ready state of the vehicle (S210).

The controller of the vehicular control system in accordance with an embodiment of the present disclosure activates the airbag controller (S225) when the charger starts charging in the ignition off state of the vehicle (S220).

As such, the vehicular control system in accordance with an embodiment of the present disclosure wakes-up the airbag controller to block the high voltage when the collision occurs at the time of the ignition off for the charging, thereby reducing the possibility of vehicle fire due to the disconnection of the high voltage system and reducing causalities due to the instantaneous introduction of the large current into the vehicle.

Figure 4:
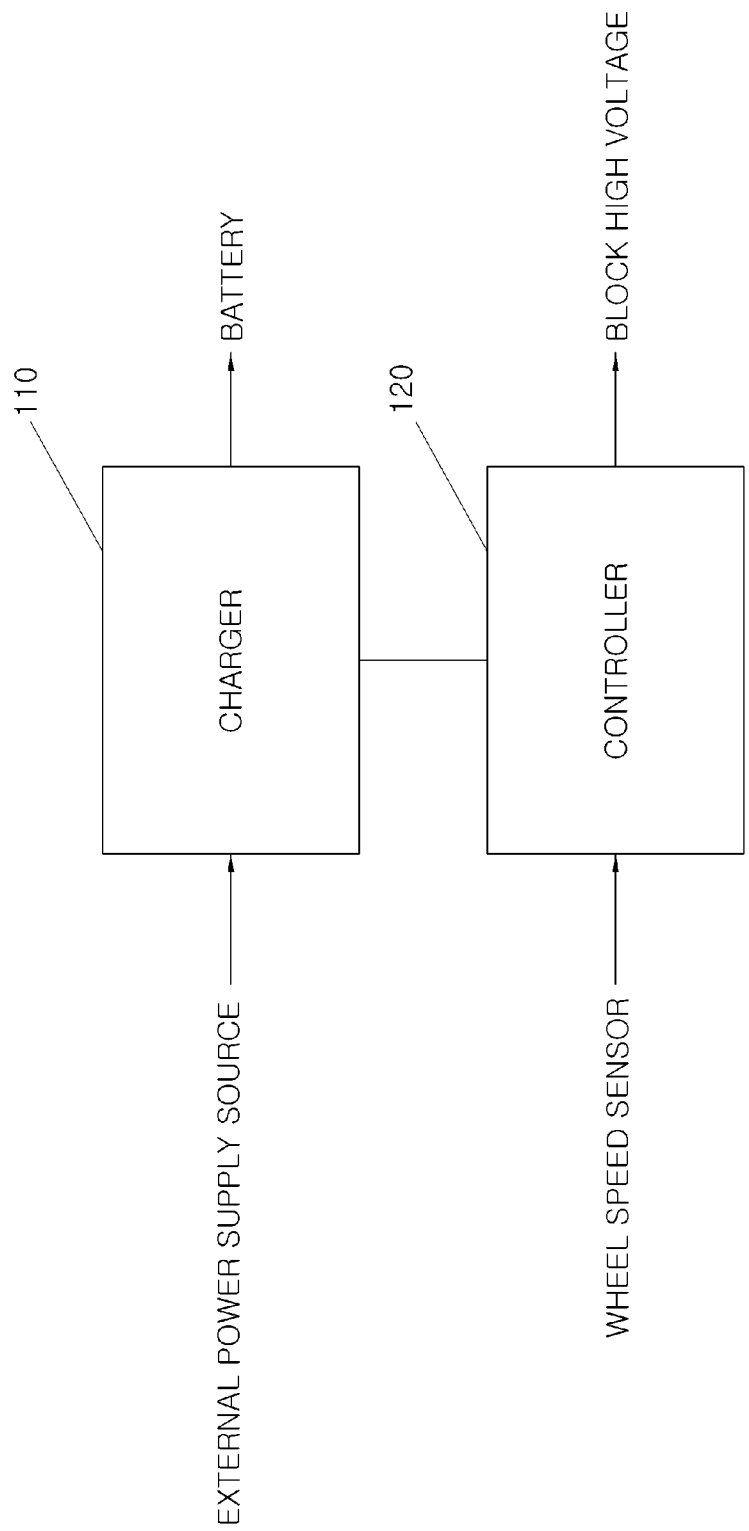
FIG. 4 is a block diagram of a vehicular control system in accordance with another embodiment of the present disclosure.

Hereinafter, other embodiments of the present disclosure will be described with reference to FIGS. 4 and 5. As illustrated in FIG. 4, the vehicular control system in accordance with another embodiment of the present disclosure may include a charger 110 for charging a battery of a vehicle from an external power supply source and a controller 120.

The controller 120 is activated when the charger 110 starts charging in an ignition off state of the vehicle and may block the high voltage system of the vehicle when it is determined that the vehicle receives a shock from the outside by using speed information transferred from a wheel speed sensor of the vehicle. For example, the high voltage system is blocked by blocking a main relay of a BMS.

That is, the controller 120 stores the speed information transferred from the wheel speed sensor when the vehicle stops, compares the stored speed information with current speed information transferred from the wheel speed sensor. Then, the controller 120 may determine that the vehicle receives the shock from the outside when a comparison result value of the speed information is within a set range. For example, when the vehicle receives the shock, a square wave signal corresponding to a vehicle movement is transferred to the controller 120 from the wheel speed sensor.

The wheel speed sensor is activated by power supplied through the charger, and a front wheel speed sensor may be implemented. When the charging is completed under normal conditions, a power supply to the wheel speed sensor is turned off, and monitoring of the speed information by the wheel speed sensor stops.

Figure 5:
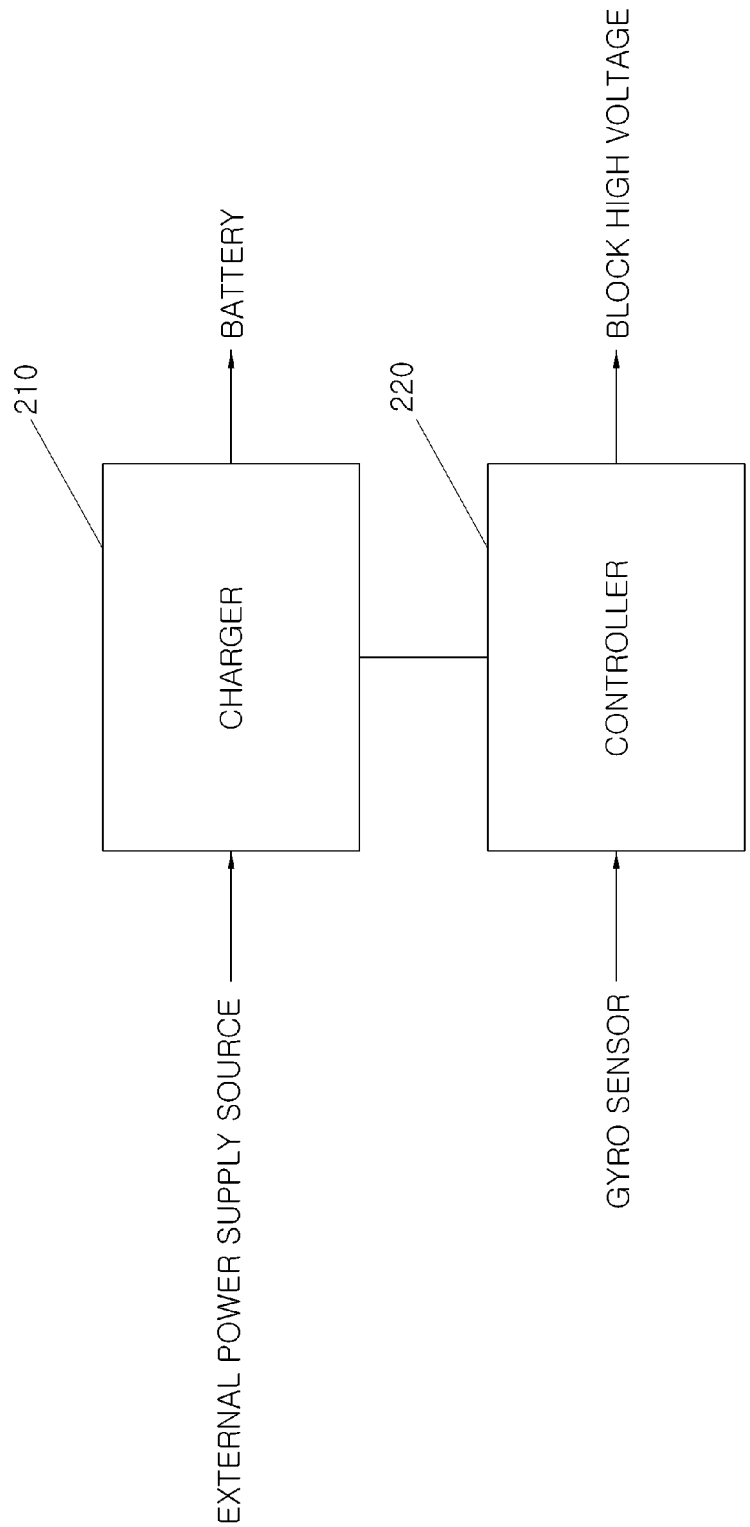
FIG. 5 is a block diagram of a vehicular control system in accordance with still another embodiment of the present disclosure.

As illustrated in FIG. 5, the vehicular control system in accordance with another embodiment of the present disclosure may include a charger 210 for charging a battery of a vehicle from an external power supply source and a controller 220.

The controller 220 is activated when the charger starts charging in an ignition off state of the vehicle and may block the high voltage system of the vehicle when it is determined that the vehicle receives a shock from the outside by using gyro sensing information transferred from a gyro sensor mounted in the vehicle.

That is, the controller 220 stores the gyro sensing information transferred from the gyro sensor when the vehicle stops and compares the stored gyro sensing information with current gyro sensing information transferred from the gyro sensor. The controller 220 may determine that the vehicle receives the shock from the outside when a comparison result value of the gyro sensing information is within a set range. The gyro sensor may be a yaw rate sensor embedded in a navigator for the vehicle.

As set forth above, in accordance with embodiments of the present disclosure, the high voltage is blocked when the collision occurs at the time of the ignition off for charging by using the information transferred from the motor position sensor of the driving motor to reduce the vehicle fire due to the disconnection of the high voltage system and reduce causalities due to the instantaneous introduction of a large current into the vehicle, thereby improving the safety performance of the vehicle.

Further, in accordance with embodiments of the present disclosure, when the collision occurs at the time of the ignition off for charging, the high voltage may be blocked by waking-up the airbag controller at the time of the ignition off, thereby reducing the possibility of vehicle fire due to the disconnection of the high voltage system and reducing causalities due to the instantaneous introduction of a large current into the vehicle.

Hereinabove, although the present disclosure is described by specific matters such as concrete components, and the like, exemplary embodiments, and drawings, they are provided only for assisting in the entire understanding of the present disclosure. Therefore, the present disclosure is not limited to the exemplary embodiments. Various modifications and changes may be made by those skilled in the art to which the present disclosure pertains from this description.

What is claimed is:

1. A vehicular control system, comprising:
a charger charging a battery of a vehicle; and
a controller configured to be activated when the charger starts charging in an ignition (IG) off state of the vehicle, and block a high voltage system of the vehicle during the charging in the IG off state when it is determined that the vehicle receives a shock from outside the vehicle,
wherein the controller is interlocked with an airbag controller of the vehicle, activates the interlocked airbag controller when the charger starts charging in the IG off state of the vehicle, and blocks the high voltage system of the vehicle when an airbag unfolding signal is transferred from the airbag controller to the controller in an IG on or IG ready state of the vehicle, and
wherein the high voltage system is blocked by blocking a main relay of a battery management system (BMS).

2. The vehicular control system of claim 1, wherein the controller is activated by power supplied through the charger.

3. The vehicular control system of claim 2, wherein the controller is implemented as a vehicle controller (VC), a motor controller (MC), the BMS, and an on-board computer (OBC).

4. The vehicular control system of claim 1, wherein the controller determines that the vehicle receives the shock from the outside by using gyro sensing information transferred from a gyro sensor.

5. The vehicular control system of claim 1, wherein the controller stores gyro sensing information transferred from a gyro sensor when the vehicle stops, compares the stored gyro sensing information with current gyro sensing information transferred from a gyro sensor, and determines that the vehicle receives the shock from the outside when a comparison result value of the gyro sensing information is within a set range.

6. The vehicular control system of claim 5, wherein the gyro sensor is a yaw rate sensor embedded in a navigator mounted in the vehicle.

7. The vehicular control system of claim 1, wherein the controller determines that the vehicle receives the shock from the outside by using speed information transferred from a wheel speed sensor of the vehicle.

8. The vehicular control system of claim 1, wherein a wheel speed sensor is activated by power supplied through the charger.

9. The vehicular control system of claim 8, wherein the controller stores speed information transferred from the wheel speed sensor when the vehicle stops, compares the stored speed information with current speed information transferred from the wheel speed sensor, and determines that the vehicle receives the shock from the outside when a comparison result value of the speed information is within a set range.

10. The vehicular control system of claim 1, wherein the airbag controller of the vehicle is activated when the airbag unfolding signal is not transferred from the airbag controller in the IG on or IG ready state of the vehicle.

11. The vehicular control system of claim 1, wherein the controller determines that the vehicle receives the shock from the outside by using positional information transferred from a motor position sensor of a driving motor.

12. The vehicular control system of claim 11, wherein the controller stores the positional information transferred from the motor position sensor when the vehicle stops, compares the stored positional information with current positional information transferred from the motor position sensor, and determines that the vehicle receives the shock from the outside when a comparison result value of the positional information is within a set range.

13. An operating method of a vehicular control system, the method comprising steps of:
   activating, by a controller, the vehicular control system when a charger starts charging in an ignition (IG) off state of a vehicle;
   determining, by the controller, whether the vehicle receives a shock from outside the vehicle; and
   blocking, by the controller, a high voltage system of the vehicle during the charging in the IG off state when it is determined that the shock is applied from outside the vehicle,
   wherein the controller is interlocked with an airbag controller of the vehicle, activates the interlocked airbag controller when the charger starts charging in the IG off state of the vehicle, and blocks the high voltage system of the vehicle when an airbag unfolding signal is transferred from the airbag controller to the controller in an IG on or IG ready state of the vehicle, and
   wherein the high voltage system is blocked by blocking a main relay of a battery management system (BMS).

14. The operating method of claim 13, wherein the step of determining whether the vehicle receives the shock from the outside comprises:
   storing positional information transferred from a motor position sensor when the vehicle stops;
   comparing the stored positional information with current positional information transferred from the motor position sensor; and
   determining that the vehicle receives the shock from the outside when a comparison result value of the positional information is within a set range.

15. The operating method of claim 13, wherein the step of determining whether the vehicle receives the shock from the outside comprises:
   storing gyro sensing information transferred from a gyro sensor when the vehicle stops;
   comparing the stored gyro sensing information with current gyro sensing information transferred from the gyro sensor; and
   determining that the vehicle receives the shock from the outside when a comparison result value of the gyro sensing information is within a set range.

16. The operating method of claim 13, wherein the step of determining whether the vehicle receives the shock from the outside comprises:
   storing speed information transferred from a wheel speed sensor when the vehicle stops;
   comparing the stored speed information with current speed information transferred from the wheel speed sensor; and
   determining that the vehicle receives the shock from the outside when a comparison result value of the speed information is within a set range.

* * * * *